(12) United States Patent
Ito

(10) Patent No.: US 11,092,095 B2
(45) Date of Patent: Aug. 17, 2021

(54) ENGINE SYSTEM

(71) Applicant: SUBARU CORPORATION, Tokyo (JP)

(72) Inventor: Gaku Ito, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/889,560

(22) Filed: Jun. 1, 2020

(65) Prior Publication Data
US 2021/0003086 A1 Jan. 7, 2021

(30) Foreign Application Priority Data
Jul. 3, 2019 (JP) .............................. JP2019-124299

(51) Int. Cl.
*F02D 41/00* (2006.01)
*F02D 41/40* (2006.01)
*F02D 41/14* (2006.01)

(52) U.S. Cl.
CPC ..... *F02D 41/0072* (2013.01); *F02D 41/0052* (2013.01); *F02D 41/1454* (2013.01); *F02D 41/40* (2013.01); *F02D 41/0077* (2013.01); *F02D 2200/04* (2013.01); *F02D 2200/0614* (2013.01); *F02D 2200/08* (2013.01)

(58) Field of Classification Search
CPC .. F02D 41/00; F02D 41/0007; F02D 41/0052; F02D 41/0072; F02D 41/40
USPC ................. 701/102–105, 108; 123/295–299, 123/568.11–568.17, 568.21
See application file for complete search history.

(56) References Cited

U.S. PATENT DOCUMENTS

| | | | |
|---|---|---|---|
| 6,176,227 B1* | 1/2001 | Ohuchi | F02D 41/3029 123/698 |
| 6,223,716 B1* | 5/2001 | Kadota | B60T 17/02 123/295 |
| 6,334,424 B1* | 1/2002 | Ito | B60W 10/06 123/295 |
| 10,590,874 B2* | 3/2020 | Dudar | F02B 77/04 |
| 2002/0062640 A1* | 5/2002 | Takahashi | F01N 9/00 60/285 |

(Continued)

FOREIGN PATENT DOCUMENTS

JP 2007-332925 A 12/2007

*Primary Examiner* — John Kwon
*Assistant Examiner* — Johnny H Hoang
(74) *Attorney, Agent, or Firm* — Troutman Pepper Hamilton Sanders LLP

(57) ABSTRACT

An engine system includes an intake pipe, an exhaust pipe, an exhaust gas recirculation (EGR) pipe, an injection amount deriver, and a fuel injector. The intake pipe is configured to direct intake air into a combustion chamber of an engine. The exhaust pipe is configured to receive exhaust gas discharged from the combustion chamber. The EGR pipe is coupled to the exhaust pipe and the intake pipe and configured to recirculate the exhaust gas into the intake pipe as EGR gas. The injection amount deriver is configured to derive a target injection amount of fuel using a mass of air contained in the EGR gas or a mass of fuel contained in the EGR gas and using a preset target air excess coefficient. The fuel injector is configured to inject an amount of fuel corresponding to the target injection amount derived by the injection amount deriver into the combustion chamber.

16 Claims, 2 Drawing Sheets

(56) References Cited

U.S. PATENT DOCUMENTS

| | | | |
|---|---|---|---|
| 2002/0134073 A1* | 9/2002 | Nishiyama | F02D 41/3035 |
| | | | 60/285 |
| 2004/0230364 A1* | 11/2004 | Uchida | F02D 41/0062 |
| | | | 701/101 |
| 2013/0081600 A1* | 4/2013 | Fukui | F02D 41/0042 |
| | | | 123/520 |
| 2014/0311124 A1* | 10/2014 | Tsujimoto | F01N 9/002 |
| | | | 60/274 |
| 2017/0314500 A1* | 11/2017 | Ogata | F02D 41/0072 |

* cited by examiner

ENGINE SYSTEM

CROSS-REFERENCE TO RELATED APPLICATIONS

The present application claims priority from Japanese Patent Application No. 2019-124299 filed on Jul. 3, 2019, the entire contents of which are hereby incorporated by reference.

BACKGROUND

The disclosure relates to an engine system including an exhaust gas recirculation (EGR) mechanism.

Engines that realize lean combustion or rich combustion have been developed in recent years. In the lean combustion, fuel is burned at an air-fuel ratio that is leaner than a stoichiometric air-fuel ratio. In the rich combustion, fuel is burned at an air-fuel ratio that is richer than the stoichiometric air-fuel ratio.

Further, engines having an EGR mechanism to reduce nitrogen oxide (NOx) emissions or reduce engine knock have been developed (e.g., Japanese Unexamined Patent Application Publication No. 2007-332925). The EGR mechanism includes an EGR flow passage that couples an exhaust passage to an intake passage, and an EGR valve that adjusts the degree of opening of the EGR flow passage. The EGR mechanism recirculates exhaust gas (EGR gas) into the intake passage through the EGR flow passage.

SUMMARY

A first aspect of the disclosure provides an engine system including an intake pipe, an exhaust pipe, an exhaust gas recirculation (EGR) pipe, an injection amount deriver, and a fuel injector. The intake pipe is configured to direct intake air into a combustion chamber of an engine. The exhaust pipe is configured to receive exhaust gas discharged from the combustion chamber. The EGR pipe is coupled to the exhaust pipe and the intake pipe and configured to recirculate the exhaust gas into the intake pipe as EGR gas. The injection amount deriver is configured to derive a target injection amount of fuel using a mass of air contained in the EGR gas or a mass of fuel contained in the EGR gas and using a preset target air excess coefficient. The fuel injector is configured to inject an amount of fuel corresponding to the target injection amount derived by the injection amount deriver into the combustion chamber.

A second aspect of the disclosure provides an engine system including an intake pipe, an exhaust pipe, an exhaust gas recirculation (EGR) pipe, a fuel injector, and circuitry. The intake pipe is configured to direct intake air into a combustion chamber of an engine. The exhaust pipe is configured to receive exhaust gas discharged from the combustion chamber. The EGR pipe is coupled to the exhaust pipe and the intake pipe and configured to recirculate the exhaust gas into the intake pipe as EGR gas. The circuitry is configured to derive a target injection amount of fuel using a mass of air contained in the EGR gas or a mass of fuel contained in the EGR gas and using a preset target air excess coefficient, and control the fuel injector to inject an amount of fuel corresponding to the derived target injection amount into the combustion chamber.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When the lean combustion is performed, the amount of air (oxygen) contained in the exhaust gas is larger than when stoichiometric combustion is performed. If the EGR gas is recirculated into the intake passage during the lean combustion, the amount of air entering a combustion chamber of the engine increases by the amount of air contained in the EGR gas. As a result, the ignitability in the combustion chamber may decrease.

When the rich combustion is performed, the amount of unburned fuel contained in the exhaust gas is larger than when the stoichiometric combustion is performed. If the EGR gas is recirculated into the intake passage during the rich combustion, the amount of fuel entering the combustion chamber of the engine increases by the amount of fuel contained in the EGR gas. As a result, the amount of unburned fuel (or hydrocarbon) contained in the exhaust gas may increase.

It is desirable to provide an engine system that can reduce the amount of fuel contained in the exhaust gas while improving the ignitability in a combustion chamber.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Engine System 100

Figure 1:
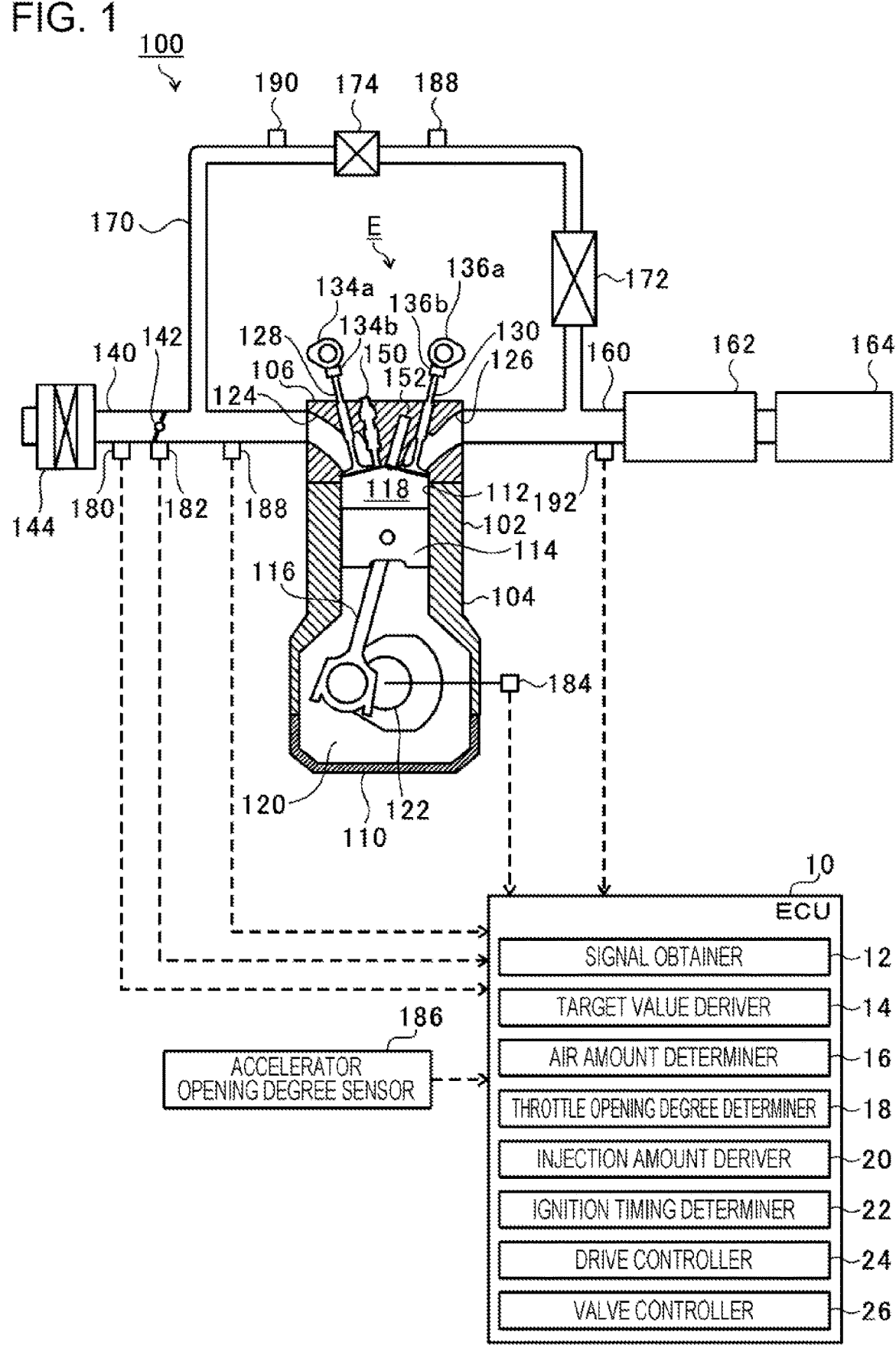
FIG. 1 illustrates an engine system according to an embodiment of the disclosure.

FIG. 1 illustrates an engine system 100 according to this embodiment. In FIG. 1, signal flows are indicated by dashed arrows. For simplicity of illustration, a dashed arrow indicating a signal flow between one of differential pressure sensors 188 and an engine control unit (ECU) 10 and a dashed arrow indicating a signal flow between a temperature sensor 190 and the ECU 10 are not illustrated in FIG. 1.

As illustrated in FIG. 1, the engine system 100 includes the ECU 10. The engine system 100 is mountable in a vehicle. The ECU 10 is implemented as a microcomputer including a central processing unit (CPU), a read-only memory (ROM) that stores programs and the like, and a random access memory (RAM) serving as a work area. The ECU 10 controls the overall operation of an engine E. In the following, the configurations and processes related to this embodiment will be described in detail, whereas the configurations and processes not related to this embodiment will not be described.

The engine E of the engine system 100 includes a cylinder block 102, a crankcase 104, a cylinder head 106, and an oil pan 110. The crankcase 104 and the cylinder block 102 are permanently joined together. The cylinder head 106 is joined to the side of the cylinder block 102 opposite to the crankcase 104. The oil pan 110 is joined to the side of the crankcase 104 opposite to the cylinder block 102.

The cylinder block 102 has a plurality of cylinder bores 112. In the plurality of cylinder bores 112, respective pistons 114 are slidably supported by connecting rods 116. The engine E has combustion chambers 118 that are spaces surrounded by the cylinder bores 112, the cylinder head 106, and the crown surface of the pistons 114.

The engine E further has a crank chamber 120 that is a space surrounded by the crankcase 104 and the oil pan 110. In the crank chamber 120, a crankshaft 122 is supported rotatably, and the pistons 114 are coupled to the crankshaft 122 via the connecting rods 116.

The cylinder head 106 has an intake port 124 and an exhaust port 126 that communicate with each of the combustion chambers 118. A distal end (head) of an intake valve 128 is located between the intake port 124 and the combustion chamber 118, and a distal end (head) of an exhaust valve 130 is located between the exhaust port 126 and the combustion chamber 118.

An intake cam 134a, a rocker arm 134b, an exhaust cam 136a, and a rocker arm 136b are located in a space surrounded by the cylinder head 106 and a head cover (not illustrated). The intake cam 134a abuts against the intake valve 128 via the rocker arm 134b. The intake cam 134a is fixed to an intake camshaft. The intake valve 128 moves axially as the intake camshaft rotates to open or close the communication between the intake port 124 and the combustion chamber 118. The exhaust cam 136a abuts against the exhaust valve 130 via the rocker arm 136b. The exhaust cam 136a is fixed to an exhaust camshaft. The exhaust valve 130 moves axially as the exhaust camshaft rotates to open or close the communication between the exhaust port 126 and the combustion chamber 118. The intake camshaft and the exhaust camshaft are coupled to the crankshaft 122 via belts (not illustrated) and rotate with the rotation of the crankshaft 122.

An intake pipe 140 communicating with the intake port 124 is disposed upstream of the intake port 124. The intake pipe 140 includes an intake manifold. The intake pipe 140 has a throttle valve 142 and an air cleaner 144 therein. The air cleaner 144 is disposed upstream of the throttle valve 142. The throttle valve 142 is opened or closed by an actuator in accordance with the degree of opening of an accelerator (not illustrated). Air cleaned with the air cleaner 144 is taken into the combustion chamber 118 through the intake pipe 140 and the intake port 124.

The cylinder head 106 includes an injector 150 with a fuel injection port open to the combustion chamber 118. In one embodiment, the injector 150 may serve as a "fuel injector". The cylinder head 106 further includes a spark plug 152 having a tip positioned in the combustion chamber 118. Fuel injected into the combustion chamber 118 from the injector 150 is mixed with air supplied into the combustion chamber 118 through the intake port 124 to form an air-fuel mixture. The spark plug 152 is turned on at a predetermined timing, and the air-fuel mixture generated in the combustion chamber 118 is ignited. The ignition of the air-fuel mixture causes the piston 114 to reciprocate, and the reciprocation of the piston 114 is converted into rotation of the crankshaft 122 through the connecting rod 116.

An exhaust pipe 160 communicating with the exhaust port 126 is disposed downstream of the exhaust port 126. The exhaust pipe 160 includes an exhaust manifold. The exhaust pipe 160 has a purification catalyst 162 therein. Examples of the purification catalyst 162 include a three-way catalyst (TWC), and a lean NOx trap (LNT) catalyst.

The three-way catalyst contains catalytic components such as platinum (Pt), palladium (Pd), and rhodium (Rh). The three-way catalyst purifies the exhaust gas discharged from the exhaust port 126. For example, the three-way catalyst removes hydrocarbon (HC), carbon monoxide (CO), and nitrogen oxide (NOx) from the exhaust gas. The LNT catalyst absorbs the NOx contained in the exhaust gas, which is not removed by the three-way catalyst, and reduces the absorbed NOx at a predetermined timing to purify the exhaust gas. The exhaust gas purified by the purification catalyst 162 is discharged to the outside through a muffler 164.

An EGR pipe 170 is coupled to the upstream side of the purification catalyst 162 in the exhaust pipe 160 and to the downstream side of the throttle valve 142 in the intake pipe 140. The EGR pipe 170 recirculates a portion of the exhaust gas flowing through the exhaust pipe 160 into the intake pipe 140. The recirculated portion of the exhaust gas is hereinafter referred to as "EGR gas".

The EGR pipe 170 has an EGR cooler 172. The EGR gas cooled by the EGR cooler 172 is recirculated into the combustion chamber 118 through the intake pipe 140 and the intake port 124. An EGR valve 174 is disposed downstream of the EGR cooler 172 in the EGR pipe 170. The EGR valve 174 opens or closes the EGR pipe 170 to adjust the flow passage width to control the flow rate of the EGR gas flowing through the EGR pipe 170. The EGR gas flowing into the intake pipe 140 through the EGR pipe 170 is supplied into the combustion chamber 118 together with fresh air passing through the throttle valve 142.

The engine system 100 further includes an intake air amount sensor 180, a throttle opening degree sensor 182, a crank angle sensor 184, an accelerator opening degree sensor 186, the differential pressure sensors 188, the temperature sensor 190, and an oxygen sensor 192.

The intake air amount sensor 180 is disposed between the air cleaner 144 and the throttle valve 142 in the intake pipe 140. The intake air amount sensor 180 detects the amount of air taken into the engine E. The throttle opening degree sensor 182 detects the degree of opening of the throttle valve 142. The crank angle sensor 184 detects the crank angle of the crankshaft 122. The accelerator opening degree sensor 186 detects the degree of opening of the accelerator (not illustrated). The differential pressure sensors 188 detect a pressure difference between the space between the junction of the intake pipe 140 with the EGR pipe 170 and the intake port 124 and the upstream side of the EGR valve 174 in the EGR pipe 170. That is, the differential pressure sensors 188 detect a pressure difference across the EGR valve 174. The temperature sensor 190 detects the temperature of the EGR gas flowing downstream of the EGR valve 174 in the EGR pipe 170. The oxygen sensor 192 detects the oxygen concentration of the exhaust gas passing through the exhaust pipe 160.

The intake air amount sensor 180, the throttle opening degree sensor 182, the crank angle sensor 184, the accelerator opening degree sensor 186, the differential pressure sensors 188, the temperature sensor 190, and the oxygen sensor 192 are coupled to the ECU 10 and output signals indicating detection values to the ECU 10.

The ECU 10 obtains the signals output from the intake air amount sensor 180, the throttle opening degree sensor 182, the crank angle sensor 184, the accelerator opening degree sensor 186, the differential pressure sensors 188, the temperature sensor 190, and the oxygen sensor 192 and controls the engine E. To control the engine E, the ECU 10 functions as a signal obtainer 12, a target value deriver 14, an air amount determiner 16, a throttle opening degree determiner 18, an injection amount deriver 20, an ignition timing determiner 22, a drive controller 24, and a valve controller 26.

The signal obtainer 12 obtains signals indicating the values detected by the intake air amount sensor 180, the throttle opening degree sensor 182, the crank angle sensor 184, the accelerator opening degree sensor 186, the differential pressure sensors 188, the temperature sensor 190, and the oxygen sensor 192. The target value deriver 14 derives the rotational speed of the engine E (rotational speed of the crankshaft 122) using the signal indicating the crank angle, which is obtained from the crank angle sensor 184. Further, the target value deriver 14 refers to a target value map stored in advance in a memory (not illustrated) and derives a target torque and a target engine rotational speed using the derived rotational speed of the engine E and using the signal indicating the degree of opening of the accelerator, which is obtained from the accelerator opening degree sensor 186.

The air amount determiner 16 determines a target air amount using the target engine rotational speed and the target torque derived by the target value deriver 14. The target air amount indicates a target amount of air to be supplied into each of the combustion chambers 118. The throttle opening degree determiner 18 derives the sum of the respective target air amounts for the combustion chambers 118 determined by the air amount determiner 16 and determines a target throttle opening degree for taking an amount of air corresponding to the sum of the target air amounts from outside.

The injection amount deriver 20 determines an operating range by referring to an operating range map stored in advance in the memory using the target air amounts (engine loads) for the combustion chambers 118 determined by the air amount determiner 16 and using the target engine rotational speed. The operating range includes at least a stoichiometric range, a lean range, and a rich range. In the stoichiometric range, the engine E operates at the stoichiometric air-fuel ratio. In the lean range, the engine E operates at an economical air-fuel ratio in which the fuel is leaner than the stoichiometric air-fuel ratio. In the rich range, the engine E operates at an output air-fuel ratio in which the fuel is richer than the stoichiometric air-fuel ratio.

The injection amount deriver 20 determines a target air excess coefficient $\lambda\_tgt$ based on the determined operating range. When the stoichiometric range is determined as the operating range, the injection amount deriver 20 determines a target air excess coefficient $\lambda\_tgt$ of 1, that is, $\lambda\_tgt=1$. When the lean range is determined as the operating range, the injection amount deriver 20 determines a target air excess coefficient $\lambda\_tgt$ greater than 1, that is, $\lambda\_tgt>1$. When the rich range is determined as the operating range, the injection amount deriver 20 determines a target air excess coefficient $\lambda\_tgt$ less than 1, that is, $\lambda\_tgt<1$. The injection amount deriver 20 derives a target injection amount of fuel to be supplied into each of the combustion chambers 118 using the determined target air excess coefficient $\lambda\_tgt$. The process for deriving a target injection amount by using the injection amount deriver 20 will be described in detail below.

Further, the injection amount deriver 20 determines a target injection timing and a target injection duration of each of the injectors 150 using the signal indicating the crank angle detected by the crank angle sensor 184 to inject an amount of fuel corresponding to the determined target injection amount from the injector 150 during the intake or compression processes of the engine E.

The ignition timing determiner 22 determines a target ignition timing of the spark plug 152 in each of the combustion chambers 118 using the target engine rotational speed derived by the target value deriver 14 and using the signal indicating the crank angle detected by the crank angle sensor 184.

The drive controller 24 drives the actuator (not illustrated) to open the throttle valve 142 at the target throttle opening degree determined by the throttle opening degree determiner 18. Further, the drive controller 24 drives the injector 150 at the target injection timing determined by the injection amount deriver 20 for the target injection duration determined by the injection amount deriver 20 to inject an amount of fuel corresponding to the target injection amount from the injector 150. Further, the drive controller 24 turns on the spark plug 152 at the target ignition timing determined by the ignition timing determiner 22.

The valve controller 26 drives the actuator (not illustrated) to control the opening and closing of the EGR valve 174 in accordance with the rotational speed of the engine E and the engine load. For example, the memory (not illustrated) stores an EGR map. In the EGR map, a rotational speed of the engine E and an engine load (amount of intake air) are associated with a degree of opening of the EGR valve 174. The valve controller 26 refers to the EGR map and determines the degree of opening of the EGR valve 174. The valve controller 26 controls the opening and closing of the EGR valve 174 to achieve the determined degree of opening of the EGR valve 174.

As described above, the EGR gas is recirculated into the combustion chamber 118, thereby decreasing the oxygen concentration in the combustion chamber 118 and decreasing the combustion temperature. This may prevent nitrogen oxide from being generated in the combustion chamber 118 and improve fuel efficiency.

When the operating range is the lean range, however, the amount of air (oxygen) contained in the exhaust gas is larger than when the operating range is the stoichiometric range. If the EGR gas is recirculated in the lean range, the amount of air entering the combustion chamber 118 is larger than the target air amount by the amount of air contained in the EGR gas. This may reduce the ignitability in the combustion chamber 118. When the operating range is the rich range, the amount of unburned fuel contained in the exhaust gas is larger than when the operating range is the stoichiometric range. If the EGR gas is recirculated in the rich range, the amount of fuel entering the combustion chamber 118 increases by the amount of fuel contained in the EGR gas. This may increase the amount of unburned fuel (or hydrocarbon) contained in the exhaust gas, and the increased amount of unburned fuel may not be fully removed by the purification catalyst 162. As a result, the unburned fuel residues may leak out.

Accordingly, the injection amount deriver 20 derives the target injection amount in consideration of the mass of air contained in the EGR gas (mixture of gases, including nitrogen (78% by volume) and oxygen (21% by volume)) and the mass of fuel contained in the EGR gas. The following describes a target injection amount derivation method performed by the injection amount deriver 20 according to this embodiment.

Figure 2:
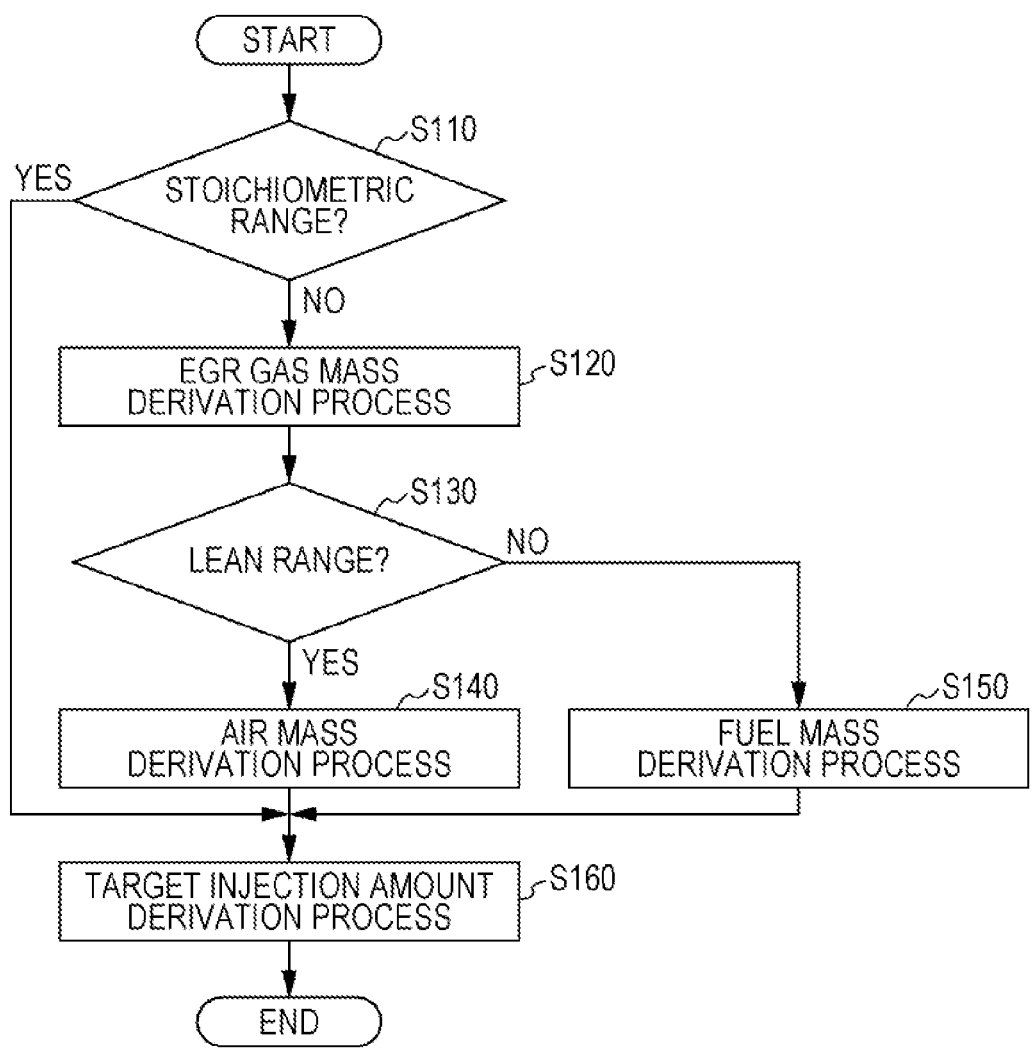
FIG. 2 is a flowchart illustrating a target injection amount derivation method according to the embodiment.

FIG. 2 is a flowchart illustrating a target injection amount derivation method according to this embodiment. As illustrated in FIG. 2, the target injection amount derivation method includes a stoichiometric range determination process S110, an EGR gas mass derivation process S120, a lean range determination process S130, an air mass derivation process S140, a fuel mass derivation process S150, and a target injection amount derivation process S160. The processes are now described in detail.

Stoichiometric Range Determination Process S110

The injection amount deriver 20 determines whether the current operating range is the stoichiometric range. If it is determined that the current operating range is the stoichiometric range (YES in S110), the injection amount deriver 20 advances the process to the target injection amount derivation process S160. If it is determined that the current operating range is not the stoichiometric range (NO in S110), the injection amount deriver 20 advances the process to the EGR gas mass derivation process S120.

EGR Gas Mass Derivation Process S120

The injection amount deriver 20 derives the mass of the EGR gas to be recirculated into the combustion chamber 118. In this embodiment, the injection amount deriver 20 derives the mass of the EGR gas to be recirculated into the combustion chamber 118 using the degree of opening of the EGR valve 174, the detection values of the differential pressure sensors 188, the detection value of the temperature sensor 190, and the rotational speed of the engine E.

For example, first, the injection amount deriver 20 derives the volumetric flow rate of the EGR gas to be recirculated into the combustion chamber 118 using the degree of opening of the EGR valve 174 and the detection values of the differential pressure sensors 188. For example, the injection amount deriver 20 derives the passage cross-sectional area of the EGR pipe 170 using the degree of opening of the EGR valve 174. Then, the injection amount deriver 20 derives the volumetric flow rate of the EGR gas to be recirculated into the combustion chamber 118 using the passage cross-sectional area of the EGR pipe 170, the detection values of the differential pressure sensors 188, and a predetermined discharge coefficient. Further, the injection amount deriver 20 derives the density of the EGR gas using the detection value of the temperature sensor 190. Then, the injection amount deriver 20 derives the mass flow rate of the EGR gas to be recirculated into the combustion chamber 118 using the derived volumetric flow rate of the EGR gas and the density of the EGR gas. The injection amount deriver 20 derives the mass of the EGR gas to be recirculated into the combustion chamber 118 per cycle using the derived mass flow rate of the EGR gas and the rotational speed of the engine E. Then, the injection amount deriver 20 advances the process to the lean range determination process S130.

Lean Range Determination Process S130

The injection amount deriver 20 determines whether the current operating range is the lean range. If it is determined that the current operating range is the lean range (YES in S130), the injection amount deriver 20 advances the process to the air mass derivation process S140. On the other hand, if it is determined that the current operating range is not the lean range (NO in S130), that is, if it is determined that the current operating range is the rich range, the injection amount deriver 20 advances the process to the fuel mass derivation process S150.

Air Mass Derivation Process S140

The injection amount deriver 20 derives the mass of air contained in the EGR gas to be recirculated into the combustion chamber 118 using the mass of the EGR gas derived in the EGR gas mass derivation process S120, the stoichiometric air-fuel ratio, and the detection value of the oxygen sensor 192.

For example, air having a mass MAir_in [g] and fuel having a mass MFuel_in [g] are mixed and the mixture is ignited to generate exhaust gas having a mass MExh_all [g]. In this case, following equation (1) holds from the law of conservation of mass.

$$M\text{Exh\_all} = M\text{Air\_in} + M\text{Fuel\_in} \quad (1)$$

When the air excess coefficient of the exhaust gas is denoted by $\lambda$ and the stoichiometric air-fuel ratio is denoted by a, following equation (2) holds.

$$M\text{Air\_in}/M\text{Fuel\_in} = a \times \lambda \quad (2)$$

When the mass of air contained in the exhaust gas is denoted by MAir_ex, following equation (3) holds.

$$M\text{Air\_ex} = M\text{Air\_in} - a \times M\text{Fuel\_in} \quad (3)$$

Substituting equations (1) and (2) into equation (3) yields equation (4).

$$M\text{Air\_ex} = M\text{Exh\_all} \times a \times \{\lambda - 1/(1 + a \times \lambda)\} \quad (4)$$

When the mass of fuel contained in the exhaust gas is denoted by MFuel_ex, following equation (5) holds.

$$M\text{Fuel\_ex} = M\text{Fuel\_in} - M\text{Air\_in}/a \quad (5)$$

Substituting equations (1) and (2) into equation (5) yields equation (6).

$$M\text{Fuel\_ex} = M\text{Exh\_all} \times \{1 - \lambda/(1 + a \times \lambda)\} \quad (6)$$

Accordingly, first, the injection amount deriver 20 derives the air excess coefficient $\lambda$ of the exhaust gas flowing through the exhaust pipe 160 using the detection value of the oxygen sensor 192. Then, the injection amount deriver 20 substitutes the mass Megr_all of the EGR gas derived in the EGR gas mass derivation process S120 for MExh_all in equation (4) above and substitutes the air excess coefficient $\lambda$ derived using the detection value of the oxygen sensor 192 for $\lambda$ in equation (4) above to derive the mass Mair_egr of air contained in the EGR gas. That is, in the air mass derivation process S140, the injection amount deriver 20 derives the mass Mair_egr of air contained in the EGR gas to be recirculated into the combustion chamber 118 per cycle using following equation (7).

$$M\text{air\_egr} = M\text{egr\_all} \times a \times \{\lambda - 1/(1 + a \times \lambda)\} \quad (7)$$

Fuel Mass Derivation Process S150

The injection amount deriver 20 derives the mass of fuel contained in the EGR gas to be recirculated into the combustion chamber 118 using the mass Megr_all of the EGR gas derived in the EGR gas mass derivation process S120, the stoichiometric air-fuel ratio a, and the detection value of the oxygen sensor 192.

For example, first, the injection amount deriver 20 derives the air excess coefficient $\lambda$ of the exhaust gas flowing through the exhaust pipe 160 using the detection value of the oxygen sensor 192. Then, the injection amount deriver 20 substitutes the mass Megr_all of the EGR gas derived in the EGR gas mass derivation process S120 for MExh_all in equation (6) above and substitutes the air excess coefficient $\lambda$ derived using the detection value of the oxygen sensor 192 for $\lambda$ in equation (6) above to derive the mass Mfuel_egr of fuel contained in the EGR gas. That is, in the fuel mass derivation process S150, the injection amount deriver 20 derives the mass Mfuel_egr of fuel contained in the EGR gas to be recirculated into the combustion chamber 118 per cycle using following equation (8).

$$M\text{fuel\_egr} = M\text{egr\_all} \times \{1 - \lambda/(1 + a \times \lambda)\} \quad (8)$$

Target Injection Amount Derivation Process S160

The injection amount deriver 20 derives the mass Mair_thr of fresh air directed into the combustion chamber 118 through the throttle valve 142 (the intake pipe 140) using the detection value of the intake air amount sensor 180. Then, the injection amount deriver 20 derives a target injection amount Mfuel_tgt using the derived mass Mair_thr of fresh air, the mass Mair_egr of air contained in the EGR gas, which is derived in the air mass derivation process S140, the mass Mfuel_egr of fuel contained in the EGR gas, which is derived in the fuel mass derivation process S150, the stoichiometric air-fuel ratio a, and the determined target air excess coefficient λ_tgt in accordance with following equation (A).

$$M\text{fuel\_tgt} = \{(M\text{air\_thr} + M\text{air\_egr}) \div (a \times \lambda\_\text{tgt})\} - M\text{fuel\_egr} \quad (A)$$

When the operating range is the stoichiometric range, the EGR gas (exhaust gas) does not contain air or fuel. Accordingly, in the stoichiometric range, the injection amount deriver 20 substitutes zero (0) for the mass Mair_egr of air contained in the EGR gas and the mass Mfuel_egr of fuel contained in the EGR gas in equation (A) above to derive the target injection amount Mfuel_tgt.

On the other hand, when the operating range is the lean range, the amount of air directed into the combustion chamber 118 is larger than when the operating range is the stoichiometric range. Accordingly, in the lean range, the EGR gas (exhaust gas) does not contain fuel. In the lean range, the injection amount deriver 20 substitutes zero (0) for the mass Mfuel_egr of fuel contained in the EGR gas in equation (A) above to derive the target injection amount Mfuel_tgt.

When the operating range is the rich range, the amount of air directed into the combustion chamber 118 is smaller than when the operating range is the stoichiometric range. Accordingly, in the rich range, the EGR gas (exhaust gas) does not contain air. In the rich range, the injection amount deriver 20 substitutes zero (0) for the mass Mair_egr of air contained in the EGR gas in equation (A) above to derive the target injection amount Mfuel_tgt.

As described above, when the operating range is the lean range, the engine system 100 according to this embodiment derives the target injection amount Mfuel_tgt in consideration of the mass Mair_egr of air contained in the EGR gas and injects an amount of fuel corresponding to the target injection amount Mfuel_tgt into the combustion chamber 118. That is, when the operating range is the lean range, the engine system 100 injects an amount of fuel, which includes an increase of an extra amount corresponding to the mass Mair_egr of air contained in the EGR gas, into the combustion chamber 118. With this operation, the engine system 100 may improve the ignitability in the combustion chamber 118. Accordingly, the engine system 100 may avoid the occurrence of an accidental fire in the combustion chamber 118.

When the operating range is the rich range, the engine system 100 derives the target injection amount Mfuel_tgt in consideration of the mass Mfuel_egr of fuel contained in the EGR gas and injects an amount of fuel corresponding to the target injection amount Mfuel_tgt into the combustion chamber 118. That is, when the operating range is the rich range, the engine system 100 injects an amount of fuel, which includes a decrease of the mass Mfuel_egr of fuel contained in the EGR gas, into the combustion chamber 118. With this operation, the engine system 100 may avoid supply of an excessive amount of fuel into the combustion chamber 118. This enables the engine system 100 to prevent an increase in unburned fuel (or hydrocarbon) contained in the exhaust gas. Accordingly, the engine system 100 may avoid leak of fuel out of the muffler 164.

In addition, the engine system 100 may derive an optimum target injection amount Mfuel_tgt merely using equation (A) above, regardless of the operating range, namely, the stoichiometric range, the lean range, or the rich range. Thus, the engine system 100 has a smaller processing load than the configuration in which unique calculation formulas are referred to for the respective operating ranges.

In the engine system 100, furthermore, the injection amount deriver 20 corrects the target injection amount Mfuel_tgt in accordance with the operating range. With this configuration, the engine system 100 may improve the ignitability in the combustion chamber 118 and the response to a reduction in fuel contained in the exhaust gas, compared with a case where the degree of opening of the throttle valve 142 is adjusted to correct the target air amount.

While an embodiment of the disclosure has been described with reference to the accompanying drawings, it goes without saying that the disclosure is not limited to the embodiment. It is to be understood that a person skilled in the art can make various changes or modifications within the scope as defined in the appended claims and that such changes or modifications also fall within the technical scope of the disclosure.

In the embodiment described above, the injection amount deriver 20 derives the target injection amount Mfuel_tgt using equation (A) above. The injection amount deriver 20 may adopt any other derivation method to derive the target injection amount Mfuel_tgt using the mass Mair_egr of air contained in the EGR gas or the mass Mfuel_egr of fuel contained in the EGR gas and using the preset target air excess coefficient λ_tgt. For example, a correction map in which each operating range, a degree of opening of the EGR valve 174, and a mass Mair_egr of air contained in the EGR gas or a mass Mfuel_egr of fuel contained in the EGR gas are associated with each other may be stored in the memory. The engine system 100 may refer to the correction map and derive the mass Mair_egr of air contained in the EGR gas or the mass Mfuel_egr of fuel contained in the EGR gas.

In the embodiment described above, furthermore, the injection amount deriver 20 derives the mass Mair_egr of air contained in the EGR gas and the mass Mfuel_egr of fuel contained in the EGR gas using the mass Megr_all of the EGR gas and the air excess coefficient λ of the EGR gas. The injection amount deriver 20 may adopt any other derivation method to derive the mass Mair_egr of air contained in the EGR gas or the mass Mfuel_egr of fuel contained in the EGR gas. For example, the engine system 100 may include a sensor capable of detecting the mass Mair_egr of air contained in the EGR gas or the mass Mfuel_egr of fuel contained in the EGR gas. The injection amount deriver 20 may derive the target injection amount Mfuel_tgt using a detection value of the sensor.

In an embodiment of the disclosure, it is possible to reduce the amount of fuel contained in the exhaust gas while improving the ignitability in a combustion chamber.

The ECU 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 10 including the signal obtainer 12, the target value deriver 14, the air amount determiner 16, the throttle opening degree determiner 18, the injection amount deriver 20, the ignition timing determiner 22, the drive controller 24, and the valve controller 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An engine system comprising:
an intake pipe configured to direct intake air into a combustion chamber of an engine;
an exhaust pipe configured to receive exhaust gas discharged from the combustion chamber;
an exhaust gas recirculation pipe coupled to the exhaust pipe and the intake pipe and configured to recirculate EGR gas, the EGR gas being at least a part of the exhaust gas, the EGR gas being delivered from the exhaust pipe into the intake pipe through the exhaust gas recirculation pipe, the EGR gas including at least one of air and fuel;
a controller configured to derive a target injection amount of fuel using at least one of a mass of the air and a mass of the fuel and using a target air-excess-coefficient, the controller being configured to determine the target air-excess-coefficient so that the target air-excess-coefficient corresponds to a target value of air-fuel ratio in the engine; and
a fuel injector configured to inject an amount of fuel corresponding to the target injection amount derived by the controller into the combustion chamber.

2. The engine system according to claim 1, wherein the controller is configured to calculate at least one of the mass of the air and the mass of the fuel using a mass of the EGR gas and an oxygen concentration of the exhaust gas passing through the exhaust pipe.

3. The engine system according to claim 2, wherein the controller is configured to derive the target injection amount using the following equation (A):

$$Mfuel\_tgt = \{(Mair\_thr + Mair\_egr) \div (a \times \lambda\_tgt)\} - Mfuel\_egr \quad (A)$$

where Mair_thr denotes a mass of fresh air directed into the combustion chamber through the intake pipe, Mair_egr denotes the mass of the air contained in the EGR gas, Mfuel_egr denotes the mass of the fuel contained in the EGR gas, a denotes a stoichiometric air-fuel ratio, λ_tgt denotes the target air-excess-coefficient, and Mfuel_tgt denotes the target injection amount.

4. The engine system according to claim 1, wherein the controller is configured to derive the target injection amount using the following equation (A):

$$Mfuel\_tgt = \{(Mair\_thr + Mair\_egr) \div (a \times \lambda\_tgt)\} - Mfuel\_egr \quad (A)$$

where Mair_thr denotes a mass of fresh air directed into the combustion chamber through the intake pipe, Mair_egr denotes the mass of the air, Mfuel_egr denotes the mass of the fuel, a denotes a stoichiometric air-fuel ratio, λ_tgt denotes the target air-excess-coefficient, and Mfuel_tgt denotes the target injection amount.

5. The engine system according to claim 1, wherein
the controller is configured to derive at least one of the mass of the air and or the mass of the fuel based on one or more detection values of one or more sensors, and
the one or more sensors are disposed on the exhaust gas recirculation pipe.

6. The engine system according to claim 1, wherein
the engine is allowed to operate in operation ranges including a stoichiometric range where the engine operates in a stoichiometric air-fuel ratio, and a lean range where the engine operates in a lean air-fuel ratio, and
the controller is configured to:
identify an operation range among the operation ranges based on a target value of a rotational speed of the engine;
identify, when identifying that the operation range is the stoichiometric range, a first target air-excess-coefficient as the target air-excess-coefficient; and
identify, when identifying that the operation range is the lean range, a second target air-excess-coefficient being different from the first target air-excess-coefficient as the target air-excess-coefficient.

7. The engine system according to claim 6, wherein the controller is configured to derive at least one of the mass of the air and the mass of the fuel in the EGR gas based on a map in which the operating ranges are associated with at least one of the mass of the air and the mass of the fuel in the EGR gas.

8. The engine system according to claim 6, wherein
the operation ranges further includes a rich range where the engine operates in a rich air-fuel ratio, and
the controller is configured to:
identify, when identifying that the operation range is the lean range, the second target air-excess-coefficient being more than the first target air-excess-coefficient as the target air-excess-coefficient; and
identify, when identifying that the operation range is the rich range, a third target air-excess-coefficient being less than the first target air-excess-coefficient as the target air-excess-coefficient.

9. The engine system according to claim 8, wherein the controller is configured to derive at least one of the mass of the air and the mass of the fuel in the EGR gas based on a map in which the operating ranges are associated with at least one of the mass of the air and the mass of the fuel in the EGR gas.

10. An engine system comprising:
an intake pipe configured to direct intake air into a combustion chamber of an engine;
an exhaust pipe configured to receive exhaust gas discharged from the combustion chamber;
an exhaust gas recirculation pipe coupled to the exhaust pipe and the intake pipe and configured to recirculate EGR gas, the EGR gas being at least a part of the exhaust gas, the EGR gas being delivered from the exhaust pipe into the intake pipe through the exhaust gas recirculation pipe, the EGR gas including at least one of air and fuel;
a fuel injector; and
circuitry configured to
determine a target air-excess-coefficient so that the target air-excess-coefficient corresponds to a target value of air-fuel ratio in the engine,
derive a target injection amount of fuel using at least one of a mass of the air or a mass of the fuel and using flail the target air-excess-coefficient, and
control the fuel injector to inject an amount of fuel corresponding to the derived target injection amount into the combustion chamber.

11. The engine system according to claim 10, wherein the circuitry is configured to derive at least one of the mass of the air and the mass of the fuel based on one or more detection values of one or more sensors, and
the one or more sensors are disposed on the exhaust gas recirculation pipe.

12. The engine system according to claim 10, wherein the circuitry is configured to calculate at least one of the mass of the air and the mass of the fuel using a mass of the EGR gas and an oxygen concentration of the exhaust gas passing through the exhaust pipe.

13. The engine system according to claim 10, wherein
the engine is allowed to operate in operation ranges including a stoichiometric range where the engine operates in a stoichiometric air-fuel ratio, and a lean range where the engine operates in a lean air-fuel ratio, and
the circuitry is configured to:
identify an operation range among the operation ranges based on a target value of a rotational speed of the engine;
identify, when identifying that the operation range is the stoichiometric range, a first target air-excess-coefficient as the target air-excess-coefficient; and
identify, when identifying that the operation range is the lean range, a second target air-excess-coefficient being different from the first target air-excess-coefficient as the target air-excess-coefficient.

14. The engine system according to claim 13, wherein the circuitry is configured to derive at least one of the mass of the air and the mass of the fuel in the EGR gas based on a map in which the operating ranges are associated with at least one of the mass of the air and the mass of the fuel in the EGR gas.

15. The engine system according to claim 13, wherein
the operation ranges further includes a rich range where the engine operates in a rich air-fuel ratio, and
the controller is configured to:
identify, when identifying that the operation range is the lean range, the second target air-excess-coefficient being more than the first target air-excess-coefficient as the target air-excess-coefficient; and
identify, when identifying that the operation range is the rich range, a third target air-excess-coefficient being less than the first target air-excess-coefficient as the target air-excess-coefficient.

16. The engine system according to claim 15, wherein the circuitry is configured to derive at least one of the mass of the air and the mass of the fuel in the EGR gas based on a map in which the operating ranges are associated with at least one of the mass of the air and the mass of the fuel in the EGR gas.

* * * * *